(12) United States Patent
Kleffel et al.

(10) Patent No.: US 10,449,869 B2
(45) Date of Patent: Oct. 22, 2019

(54) METHOD FOR SYMMETRIZING AN ENERGY STORAGE SYSTEM

(71) Applicant: SIEMENS AKTIENGESELLSCHAFT, München (DE)

(72) Inventors: Rüdiger Kleffel, Erlangen (DE); Fabian Quast, Erlangen (DE); Swen Ruppert, Möhrendorf (DE)

(73) Assignee: SEIMENS AKTIENGESELLSCHAFT, München (DE)

( * ) Notice: Subject to any disclaimer, the term of this patent is extended or adjusted under 35 U.S.C. 154(b) by 99 days.

(21) Appl. No.: 15/531,273

(22) PCT Filed: Nov. 19, 2015

(86) PCT No.: PCT/EP2015/077055
§ 371 (c)(1),
(2) Date: May 26, 2017

(87) PCT Pub. No.: WO2016/083223
PCT Pub. Date: Jun. 2, 2016

(65) Prior Publication Data
US 2017/0358932 A1    Dec. 14, 2017

(30) Foreign Application Priority Data
Nov. 28, 2014    (EP) ..................................... 14195458

(51) Int. Cl.
*B60L 11/18*    (2006.01)
*H01M 10/42*    (2006.01)
(Continued)

(52) U.S. Cl.
CPC ............ *B60L 11/1866* (2013.01); *B60L 58/22* (2019.02); *H01G 11/08* (2013.01); *H01G 11/14* (2013.01);
(Continued)

(58) Field of Classification Search
CPC ... B60L 11/1866; H02J 7/0016; H02J 7/0021; H02J 7/345; H02J 7/0014; H01G 11/14;
(Continued)

(56) References Cited

U.S. PATENT DOCUMENTS 6,788,027 B2 *    9/2004    Malik ..................... B60K 6/48
320/134
6,806,686 B1 *    10/2004    Thrap ..................... H02J 7/345
320/118
(Continued)

FOREIGN PATENT DOCUMENTS

CN    103248084 A    3/2010
CN    103248064 A    8/2013
(Continued)

*Primary Examiner* — Naum Levin
(74) *Attorney, Agent, or Firm* — Henry M. Feiereisen LLC

(57) ABSTRACT

In a method for balancing an energy storage system, a capacitance of capacitive storage modules of a series circuit of capacitive storage modules is determined. The capacitive storage modules are connected to a balancing device to allow control of a charge of each of the capacitive storage modules via a flow of current between the balancing device and the capacitive storage modules. For each of the capacitive storage modules a module charge is determined from a voltage of the capacitive storage module and a predefined balancing voltage. A reference charge is determined from the module charges of the capacitive storage modules, and a balancing charge is determined for each of the capacitive storage modules from the reference charge and the module charge of the capacitive storage module. The charge of the
(Continued)

US 10,449,869 B2

Page 2 capacitive storage modules is controlled by exchanging the balancing charge between the capacitive storage module and the balancing device.

21 Claims, 8 Drawing Sheets

(51) Int. Cl.
*H01M 10/44* (2006.01)
*H01M 10/46* (2006.01)
*H01G 11/08* (2013.01)
*H01G 11/14* (2013.01)
*H02J 7/00* (2006.01)
*B60L 58/22* (2019.01)
*H01M 12/00* (2006.01)
*H02J 7/34* (2006.01)

(52) U.S. Cl.
CPC ..... *H01M 10/425* (2013.01); *H01M 10/4207* (2013.01); *H01M 10/441* (2013.01); *H01M 10/46* (2013.01); *H02J 7/0016* (2013.01); *H02J 7/0021* (2013.01); *H01M 12/005* (2013.01); *H01M 2010/4271* (2013.01); *H01M 2010/4278* (2013.01); *H01M 2220/20* (2013.01); *H02J 7/0014* (2013.01); *H02J 7/345* (2013.01); *Y02E 60/13* (2013.01); *Y02T 10/7022* (2013.01)

(58) Field of Classification Search
CPC .. H01G 11/08; H01M 10/46; H01M 10/4207; H01M 10/425; H01M 10/441; H01M 2010/4271; H01M 2010/4278; H01M 2220/20; H01M 12/005; Y02T 10/7022; Y02E 60/13

See application file for complete search history.

(56) References Cited

U.S. PATENT DOCUMENTS

| | | | | |
|---|---|---|---|---|
| 6,847,192 B2* | 1/2005 | Turner | ...................... | G06F 1/30 320/166 |
| 7,180,277 B2* | 2/2007 | Thrap | ................ | H03K 17/0822 323/271 |
| 7,312,596 B2* | 12/2007 | Bolz | ...................... | H02J 7/0018 320/120 |
| 7,462,944 B2 | 12/2008 | Ruppert et al. | | |
| 7,466,104 B2* | 12/2008 | Wang | ...................... | H02J 7/0016 320/118 |
| 7,492,160 B2* | 2/2009 | Bolz | ...................... | G01R 31/3658 320/116 |
| 7,786,699 B2* | 8/2010 | Demers | ................. | H02J 7/0014 320/116 |
| 7,825,638 B2* | 11/2010 | Bolz | ...................... | G01R 31/3658 320/116 |
| 7,852,042 B2* | 12/2010 | Froeschl | ................ | H02J 7/0022 320/101 |
| 7,898,223 B2* | 3/2011 | Takeda | ..................... | H02M 3/07 320/117 |
| 7,973,514 B2* | 7/2011 | Gong | ..................... | H02J 7/0016 320/122 |
| 8,390,147 B2* | 3/2013 | Stauth | ..................... | H02J 3/385 307/77 |
| 8,716,894 B2* | 5/2014 | Uno | ...................... | H02J 7/0014 307/77 |
| 9,053,869 B2 | 6/2015 | Kleffel | | |
| 9,148,028 B2* | 9/2015 | Suzuki | .................. | H02J 7/0014 |
| 9,209,653 B2* | 12/2015 | Maynard | ................ | H02J 7/0016 |
| 9,296,348 B2* | 3/2016 | Yano | ................... | H01M 10/482 |
| 9,331,500 B2* | 5/2016 | Knitt | ...................... | H02J 7/0016 |
| 9,620,969 B2* | 4/2017 | Kobayashi | ............ | H02J 7/0016 |
| 9,966,758 B2* | 5/2018 | Nordin | ................... | H02J 7/0016 |
| 10,110,021 B2* | 10/2018 | Hamada | ................ | H01M 10/44 |
| 2003/0214267 A1* | 11/2003 | Long | ..................... | H02J 7/0016 320/116 |
| 2007/0112485 A1* | 5/2007 | Rogers | .................. | G01B 21/26 701/31.4 |
| 2011/0204722 A1* | 8/2011 | Kim | ...................... | H02J 7/0016 307/77 |
| 2012/0086401 A1* | 4/2012 | Laber | ..................... | H02J 7/0016 320/118 |
| 2013/0093400 A1* | 4/2013 | Maynard | ............... | H02J 7/0016 320/166 |
| 2013/0113432 A1* | 5/2013 | Suzuki | .................. | H02J 7/0014 320/134 |
| 2013/0207616 A1 | 8/2013 | Shim | | |
| 2014/0015321 A1* | 1/2014 | Nordin | .................. | H02J 7/0016 307/43 |
| 2014/0114594 A1 | 4/2014 | Schaefer | | |
| 2014/0265565 A1* | 9/2014 | Cooley | ..................... | H02P 6/18 307/18 |

FOREIGN PATENT DOCUMENTS

| | | |
|---|---|---|
| DE | 10 2012 011 604 A1 | 12/2013 |
| EP | 2 385 605 A2 | 11/2011 |
| EP | 2 475 067 A1 | 7/2012 |
| EP | 2 518 860 A1 | 10/2012 |
| WO | WO 2004-049540 A2 | 6/2004 |
| WO | WO 2012-171197 A1 | 12/2012 |
| WO | WO 2013-121721 A1 | 8/2013 |

\* cited by examiner

METHOD FOR SYMMETRIZING AN ENERGY STORAGE SYSTEM

CROSS-REFERENCES TO RELATED APPLICATIONS

This application is the U.S. National Stage of International Application No. PCT/EP2015/077055, filed Nov. 19, 2015, which designated the United States and has been published as International Publication No. WO 2016/083223 A1 which claims the priority of European Patent Application, Serial No. 14195458.6, filed Nov. 28, 2014, pursuant to 35 U.S.C. 119(a)-(d).

BACKGROUND OF THE INVENTION

The invention relates to a method for balancing an energy storage system, wherein the energy storage system comprises a series circuit of storage modules, wherein the series circuit of storage modules has at least two capacitive storage modules, wherein the capacitive storage modules are connected to a balancing device such that a charge of the capacitive storage modules can be influenced in each case by means of a flow of current between the balancing device and the capacitive storage modules, wherein the capacitive storage modules each have a capacitance. The invention also relates to a control device for carrying out the method and to an energy storage arrangement having a control device.

Balancing an energy storage system involves influencing individual storage modules in respect of their voltage. The individual storage modules are energy storage devices such as, for example, capacitors, in particular double-layer capacitors (ultracaps), or batteries. Capacitors or ultracaps are also termed capacitive energy storage devices. Other energy storage devices which can be assigned to this group of capacitive energy storage devices are, for example, lithium capacitors. Also other hybrid energy storage devices, often termed mixed energy storage devices, which exhibit capacitive behavior at least in some cases, may be categorized as capacitive energy storage devices. Similarly, storage modules made up of these components are termed capacitive storage modules. In the case of the energy storage systems considered, the individual storage modules are connected end to end in what is termed a series circuit. The purpose of balancing is to produce, in an operating state, a predefinable voltage at the terminals of the storage modules. For example, in the charged state, all the storage modules should assume the maximum voltage at their terminals. This prevents individual cells of this series circuit from assuming a higher voltage than others and therefore prevents the maximum permissible voltage of the individual storage module from being exceeded. Exceeding the maximum voltage means overloading of the corresponding storage module and results in significantly accelerated aging of the corresponding storage module. Balancing should take place during normal operation. It is also necessary to bring all the storage modules to zero voltage in the event of complete discharge. Balancing is also used to prevent charge reversal of storage modules to negative voltage during discharging.

The different voltages during operation of the individual capacitive storage modules are caused, among other things, by the storage modules having different capacitances. These may be caused, for example, by aging processes of the capacitive storage modules. The capacitance of storage modules usually decreases with age. The fall-off in capacitance is influenced by operating and environmental conditions, such as voltage and temperature, for example.

A usual balancing method consists of connecting a balancing resistor in parallel with the storage module if a particular threshold value of the voltage of the storage module is exceeded, so as to influence the voltage of the storage module. Thus balancing can be carried out in a state such as maximum charge, for example. In the maximum charge state, all the storage modules are then at maximum voltage. The individual storage modules can also be fully discharged to zero voltage via these balancing resistors.

Circuits are also known in which, for balancing purposes, charge is not supplied from the storage modules to a balancing resistor, but an exchange of charges takes place between the individual storage modules.

SUMMARY OF THE INVENTION

The object of the invention is to specify an optimized method for balancing an energy storage system.

This object is achieved by a method for balancing an energy storage system, wherein the energy storage system comprises storage modules connected in series, wherein the series circuit of storage modules has at least two capacitive storage modules, wherein the capacitive storage modules are connected to a balancing device such that a charge of the capacitive storage modules can be influenced in each case by means of a flow of current between the balancing device and the capacitive storage modules, wherein the capacitive storage modules each have a capacitance, said method comprising the following steps:

ascertaining the capacitance of each of the capacitive storage modules, determining a module charge for each of the capacitive storage modules at least from a voltage of the respective capacitive storage module and a predefinable balancing voltage, determining a reference charge at least from the module charges of the capacitive storage modules, determining a balancing charge for each of the capacitive storage modules at least from the reference charge and the module charge of the respective capacitive storage module, and influencing the charge of each of the capacitive storage modules by exchange of the respective balancing charge between the respective capacitive storage module and the balancing device.

This object is further achieved by a control device for carrying out the method and by an energy storage arrangement comprising a series circuit of storage modules and a control device. This object is further achieved by a vehicle having such an energy storage arrangement.

The invention is based on the insight that the balancing of storage modules connected in series can be carried out in a simple manner by considering the electric charge. The physical relationship between charge $Q_i$ and voltage $U_i$ of a capacitive storage module is:

$$Q_i = C_i \cdot U_i$$

Due to the different capacitances $C_i$ of the individual capacitive storage modules and because of any different initial charges already present, the voltages of the individual capacitive storage modules differ when they are charged with the same charge. The same charge arises as the result of the same current flowing through the storage modules connected in a series arrangement. The aim of balancing is now to influence the voltage of the individual capacitive storage modules such that, at an operating point, the individual storage modules each assume a predefinable balancing voltage. The balancing voltages of the individual capacitive storage modules need not necessarily be the same. Rather, the individual balancing voltages of the individual storage modules can differ from one another.

In a first balancing step, the capacitance of the individual series-connected capacitive storage modules is ascertained. The capacitance value of the individual capacitive storage modules is already often ascertained for determining the state of aging of the individual storage modules. This value can be used for the balancing method. It is also possible to determine the capacitance in a first step by means of estimates. For this purpose the nominal value of the capacitance can be used. This value can then be more accurately determined incrementally over time. A suitable option would be to repeat, in particular cyclically repeat, the determination of the capacitance.

Additionally or alternatively, the capacitance can also be determined via the charge and via the voltage at the capacitive storage module. Charge is the integral of current over time, so that the current through the capacitive storage modules and the voltage of the individual storage modules can be used for ascertaining the capacitance of the respective storage modules. From these values it is possible to calculate the capacitance of the individual storage modules with sufficient accuracy. It has been found to be advantageous to determine the capacitance $C_i$ of the individual storage modules when the storage module is charged for the first time, also termed ramp-up.

As the capacitance is also operating-point-dependent, e.g. nonlinear, for some energy storage devices it is also additionally or alternatively possible to ascertain or take into account the capacitance of the storage modules via previously determined characteristic curves or tables. This method has also been found to be advantageous for the case that the capacitance is dependent on the voltage of the storage module. This determination can subsequently be optimized and improved by measurements, e.g. as described above or in the sub-claims.

In a second step, for the individual capacitive storage modules, the module charge $Q_{eq\_i}$ is determined which is required in order to change the corresponding capacitive storage module from the voltage $U_i$ currently present to the predefinable balancing voltage $U_{eq\_i}$. The subscript i describes the ith storage module. The resulting module charge is given by $$Q_{eq_i} = C_i \cdot (U_{eq_i} - U_i).$$

Because of different capacitance values of the individual storage modules, different module charges can arise for the respective capacitive storage modules even when the voltage difference is the same.

In a third step, a reference charge $Q_{ref}$ is determined from the individual module charges. The determination of the reference charge is dependent, among other things, on the design of the balancing device. If resistors are used for balancing, it has been found to be particularly advantageous to create the reference charge from the maximum of the module charges. The reference charge is therefore given by $$Q_{ref} = \text{Max}[C_i \cdot (U_{eq_i} - U_i)]$$

For the case that balancing takes place by charge exchange between the individual capacitive storage modules, it has been found to be advantageous to determine the reference charge as the average of the module charges according to the formula $$Q_{ref} = \overline{[C_i \cdot (U_{eq_i} - U_i)]}.$$

Balancing by charge exchange between the individual capacitive storage modules is also termed balancing by means of charge reversal.

In a fourth step, the balancing charge is determined from the reference charge and the module charge of the individual capacitive storage modules. For example, the balancing charge can be determined from the difference between reference charge and module charge. In addition, other variables such as, for example, a tolerance for the balancing voltage can be included in the calculation. This tolerance enables the complexity involved in carrying out the method to be reduced still further. It is also possible to reduce resulting losses in order to provide efficient and low-loss balancing.

In a fifth step, the balancing charge determined is exchanged between the respective capacitive storage module and the balancing device. A particular advantage of this method is that the balancing can be carried out in every operating state. In the case of known methods from the prior art, balancing only becomes active when one or more thresholds are exceeded or undershot. This is the case when the operating state of the system is close to the state which is to be balanced. With the method according to the invention, on the other hand, balancing is also possible before the operating state is reached in which the storage modules exhibit the balancing voltage. Proactive balancing can therefore be achieved. The balanced state is attained when the balancing charge $Q_{sym\_i}$ of the individual storage modules has become zero, irrespective of the voltage $U_i$ currently exhibited by the storage modules.

With the method according to the invention, balancing can take place proactively, i.e. in advance, in any operating state before the balancing voltage $U_{eq\_i}$ is reached. This makes it possible, at any voltage and in any operating state, to place the complete system of storage modules in a state which, after balancing, is sufficiently prepared to be charged to the balancing voltage. In the balanced state, the module voltages, in the event that they are not equal to the balancing voltage, can deviate more markedly from one another than in the unbalanced state. However, the case of charging to the balancing voltage is critical. This balancing voltage can be set for the individual storage modules as required and independently of one another. Thus it is possible to set the balancing voltage to the maximum voltage of the storage modules. However, it is also useful to change the balancing voltage to zero at another point in time, e.g. when preparing for discharging. If a system is ramped up from the fully discharged state, it is advisable to carry out balancing to the balancing voltage such as, for example, the maximum voltage according to this method, as soon as possible, i.e. even at low voltages. This ensures that balanced conditions already obtain in the system when the maximum voltage is reached for the first time. Exceedance of the maximum voltage and associated overcharging of one or more modules can therefore be reliably prevented. Another advantage of preventing the maximum voltage of the individual storage modules from being exceeded is that the usable energy content of the individual storage modules is greater than in the unbalanced state. Using the method according to the invention makes it possible to utilize this advantage without the individual storage modules having to assume the maximum voltage over a particular, in some cases also lengthy period of time.

With a non-zero reference charge, balancing can be active or even completed even before a particular state is reached. This proactive balancing makes rapid balancing possible even with relatively low currents. Being dimensioned for small currents, the balancing circuit can be of significantly less expensive design.

An energy storage system is referred to as balanced when the balancing voltage $U_{eq\_i}$ of the individual storage modules can be achieved by the current through the series circuit without the balancing device having to be active. In this case the balancing charges are equal to zero. Therefore, the energy storage system is also in the balanced state when the balancing voltage has not yet been attained.

With the method according to the invention, it is likewise possible, if the balancing voltage has been set to zero, to prepare for discharging of the storage modules even when the storage device is still in operation. Charge reversal, i.e. a change of sign in the voltage across the terminals of a storage module, during a discharging process can be reliably prevented by applying the method according to the invention. This is important in that charge reversal of a storage module can result in more rapid aging of the storage module in question. The method according to the invention enables a de-energized state to be achieved quickly, in some cases even immediately after disconnection of the energy storage system. This makes it safer for maintenance personnel to handle the then completely discharged energy storage device.

Another advantage of the method according to the invention is that balancing can be carried out for each voltage state. In addition, balancing can be carried out over any period of time, so that that balancing can also be carried out over a very long period of time with low currents. The amount of heat to be dissipated is therefore very small. A further advantage is that all the capacitive storage modules can be balanced simultaneously. Thus the method according to the invention can simultaneously balance the capacitive storage modules. The balancing can be carried out very precisely under microprocessor control if voltage measurement is correspondingly accurate. Therefore, only a small amount of electrical energy is wasted in resistors. The balanced state can be achieved at any voltage level. Thus, particularly at zero voltage and at maximum voltage. The balancing voltage can be changed and therefore re-specified at any time. Balancing can be carried out proactively even if the voltage at which balanced conditions are to obtain has not yet been reached. This is particularly useful in the case of ramp-up from the discharged state where a voltage difference unavoidably occurs if the capacitances of the storage modules are different. In order to avoid unnecessarily frequent balancing due to inaccuracies, the balancing can be provided with any desired tolerance. The energy dissipation can therefore be kept to a minimum. Re-charging of the storage modules to the maximum voltage limit, which is required in the case of the method known from the prior art, is unnecessary in the case of the method according to the invention. Nor is a lossy energy source therefore necessary. The charging frequency and discharge power as well as the discharge energy of the individual storage modules can be calculated by summation over the system as a whole. Statistical loss factors and aging trends can be determined therefrom.

It has been found particularly advantageous to equip a vehicle, in particular a bus or a rail vehicle, with an energy storage arrangement. Due to the many load cycles involving starting and braking processes, using the energy storage device can have a positive effect on energy consumption. The method according to the invention ensures a high degree of utilization of the energy storage system, so that the latter can accordingly be of compact design and can be incorporated in the available space, which is often at a premium in vehicles.

Advantageous embodiments of the invention are set forth in the dependent claims.

In an advantageous embodiment of the method, the balancing voltages of the individual capacitive storage modules can be specified independently of one another. Individual capacitive storage modules or every capacitive storage module can be assigned its own balancing voltage independently of the balancing voltage of the other capacitive storage modules. The balancing voltages of the individual storage modules can be identical or differ in each case. Storage modules can also be operated in a series circuit having a different design and/or different maximum voltages, e.g. due to aging. The individual capacitive storage modules can also be assigned a varying balancing voltage over time. The change can be carried out simultaneously or also in a staggered manner for the capacitive storage modules. In particular, it has been found to be advantageous to specify the maximum voltage of the storage module as the balancing voltage. In addition or alternatively it has been found advantageous to set the balancing voltage of the individual storage modules to zero if disconnection of the energy storage system is likely to occur or a fault is detected in the energy storage system.

In another advantageous embodiment, the reference charge is constituted by the maximum value of the module charges. This is particularly advantageous if the balancing device has a resistor. The charge of the storage module can only be reduced and not increased by means of the resistor. If the reference charge is selected as the maximum of the module charges, charge only has to be removed from storage modules for the balancing process, said charge being converted into heat in the resistor. Selecting the reference charge as the maximum of the module charges means that none of the storage modules need to have charges supplied to them by means of the balancing device. For this selection of the reference voltage, balancing using a resistor can be implemented particularly simply and inexpensively as well as reliably.

In another advantageous embodiment, the reference charge is constituted by the average of the module charges. The averaging of the module charges for determining the reference charge is particularly advantageous if it is possible for charges to be exchanged between the individual capacitive storage modules by means of the balancing device. Said balancing device is also termed a balancing charge reversal circuit. The balancing charges can then be determined such that the sum of the absolute values of the positive balancing charges is equal to the sum of the absolute values of the negative balancing charges. Therefore, no energy has to be supplied to the balancing device from outside, nor is there any need to dissipate electrical energy from the storage modules, i.e. convert it into heat. This makes this embodiment particularly low-loss. The low losses mean that the method can be used cost-effectively. Particularly for frequently changing balancing voltages, this embodiment can be used particularly cost-effectively because of its low losses.

In another advantageous embodiment, the capacitance of the each individual capacitive storage module is determined by the change in the voltage of the respective capacitive storage module and in the current through the series circuit of capacitive storage modules. If the capacitances are not already available from service life observation which monitors the state of aging of the individual capacitive storage modules on the basis of their capacitance, the capacitance of the individual storage modules can be determined in a particularly simple manner from the voltage of the storage module and the current flowing through it. If no charge exchange with the balancing device takes place for the respective storage module, the current through the storage module corresponds equally to the current flowing in the series circuit of storage modules. The voltage of the storage modules for the carrying-out of the method by a corresponding control device is already known. For the protection of the energy storage system, it has been found advisable to also measure the current through the series circuit of storage modules. This enables overloading of the storage modules and in some cases associated possible thermal damage to be detected in good time and prevented. The capacitance of the respective storage module can be determined quickly and reliably from the quotient of the current through the series circuit of the storage modules and the voltage change of the respective storage module.

In another advantageous embodiment, the individual capacitive storage modules are each linked to a resistor, wherein the capacitance of the individual capacitive storage modules is determined from the voltage of the respective capacitive storage module or from a current through the resistor. As the balancing device often has a resistor, the latter can easily be used for determining the capacitance. The capacitance of the storage module can be determined from the voltage at the capacitive storage module, particularly from the change in voltage over time, if the resistance value of the parallel-connected resistor is known. This can take place, for example, via the time constant which is the product of the resistance value and the capacitance of the storage module. The time constant can be obtained from the change over time of the voltage of the capacitive storage module, in particular from the voltage gradient, or from the change over time of the current through the resistor. The advantage of this method is that only one measuring point which acquires the voltage at the storage module needs to be evaluated in order to determine the capacitance reliably. This means that the method has low susceptibility to faults. A resistor is often already present for controlling the charging or for safe discharging of the storage module, so that the capacitance can be ascertained in a particularly simple manner using components and measuring devices already present.

In another advantageous embodiment, the balancing charge for the capacitive storage modules is determined from the difference between the reference charge and the module charge of the respective capacitive storage module. In this method, the balancing charge is determined in a particularly simple manner. This method can be used both when a resistor is used to balance the storage modules and for charge reversal of the charges between the individual storage modules, e.g. by means of current sources. If the module charge exceeds the value of the reference charge, charge amounting to the balancing charge must be added to the respective storage module. In the event that the reference charge exceeds the value of the module voltage, the operation of the balancing charge must be removed from the storage module. The mathematical operation of taking the difference can be performed in a particularly simple manner by an appropriate means of calculation, in particular a microprocessor of the closed-/open-loop control system, so that a corresponding setup for carrying out the method can be produced simply and cost-effectively.

In another advantageous embodiment, the balancing charge for the capacitive storage modules is determined as a function of a predefinable tolerance band of the balancing voltage. The tolerance band can be used to obtain degrees of freedom in the closed-loop control system. For example, it is possible to dispense with the lowering of a voltage of a storage module by inserting one or more resistors, thereby reducing the electrical losses of the balancing process. Likewise, in the case of a balancing device allowing charges to be exchanged between storage modules, charge exchange with its accompanying electrical losses can be dispensed with if the resulting voltage of the storage modules is within a predefinable tolerance band around the balancing voltage. Frequent interventions of the balancing device can therefore be avoided without having to accept an overly large deviation from the predefined balancing voltage as a result. This can reduce the load placed on final control elements of the balancing device, thereby resulting in a long service life of the balancing device. This embodiment also enables currents between the storage modules and the balancing device to be reduced, thereby minimizing losses during operation and increasing the efficiency of the energy storage system. The low power loss has the advantage in energy terms that less heat has to be dissipated, as unnecessarily frequent balancing, particularly also because of inaccuracies in the system, is avoided.

In an advantageous embodiment, charges are exchanged between the capacitive storage modules by means of the balancing devices. For the case that it is possible for charge to be exchanged between the storage modules, the balancing losses can be reduced completely, but at least significantly or at least partially. By suitable selection of the reference charge, in particular by determining the reference charge as an average of the module charges, the use of resistors with their associated electrical losses can be avoided or at least reduced. Also, ohmic losses, if they occur at all, are therefore only small. The outlay for cooling and the requirement, particularly relating to the thermal loading capacity, placed on existing resistors can in some cases be significantly reduced. This results in lower costs for the design and operation of a corresponding energy storage system.

In another advantageous embodiment, the balancing voltage of the individual capacitive storage modules is set as a function of a predefinable maintenance interval and/or of the capacitance of the respective capacitive storage modules. The aging of storage modules manifests itself, among other things, in a diminishing capacitance of the storage module in question. The reduced capacitance causes the voltage fluctuations to increase. The higher voltages resulting from the maximum values of the voltage fluctuations and the higher temperature because of the higher currents, caused by the minimum values of the voltage fluctuations, result in a faster aging process of the storage modules. This aging process leads to a further reduction in the capacitance. In order to counteract the aging, the corresponding storage modules can be operated at a lower voltage. This slows down the aging process. In the case of a predefined end-of-life criterion, e.g. by defining a particular minimum capacitance at which the storage module in question has to be replaced, the lifetime can be extended by a lower operating voltage. For this purpose the predefinable balancing voltage of the respective capacitive storage module is selected correspondingly lower. This measure slows down the aging process. By predefining different balancing voltages $U_{eq\_i}$ for the individual capacitive storage modules, the aging process of the individual storage modules can be aligned such that they age at the same rate. In the case of a predefined maintenance interval, the slowing-down of the aging process can be adjusted via the reduced balancing voltage such that unscheduled maintenance can be eliminated or at least significantly reduced. Likewise, allowing for the aging of the storage modules results in a lower failure probability of the individual storage modules. The higher reliability thus obtained results in economical operation of the energy storage system.

In another advantageous embodiment, the balancing device has a resistor. The resistor is a particularly inexpensive option for influencing the charge of a storage module. For open-/closed-loop control of the current by the resistor, it has been found to be advantageous to provide a switch as the final control element. This can be a mechanical, electronic or power electronic switch, in particular a transistor. This arrangement enables balancing to be carried out in a particularly simple manner. In addition, the capacitance of the storage module can be reliably determined in a particularly simple and reliable manner from the charging/discharging characteristic.

In another advantageous embodiment, the balancing device has a current source. The current source allows exchanging of charges with the storage module in both directions. Therefore, in contrast to the resistor, not only can charge be removed from the storage module, but the charge of the storage module can also be increased. The current source therefore constitutes a final control element for charge exchange with the storage module. In contrast to the resistor for which a current arises as a function of the voltage at the storage module and the resistance value, the current source can produce virtually any currents. In particular, a current can be produced independently of the voltage of the storage module. If a current source for balancing is disposed in parallel with each storage module and the current sources are interconnected, charge exchange between the individual storage modules can be performed using the resulting arrangement. In the event of an even balance between the charge to be accepted and the charge to be released by the individual storage modules, the supply of energy can be dispensed with. In this way, virtually lossless balancing of the energy supply system can be implemented.

In another advantageous embodiment, the series circuit of storage modules comprises at least one other storage module. It has been found that the balancing method can also be used if at least one other storage module is present in the series circuit of capacitive storage modules. The other storage module can be, for example, batteries, rotating storage devices or any other energy storage devices. Another capacitive storage module can also be disposed in the series circuit as another storage module. It differs from the other capacitive storage modules in that, for example, it need not necessarily be connected to the balancing device. Balancing of the capacitive storage modules can also be reliably carried out in this arrangement.

In another advantageous embodiment, the at least one capacitive storage module comprises a series circuit and/or parallel circuit of storage cells. In order, for example, to increase the amount of energy to be stored, or, for example, to further increase the maximum voltage or the maximum current of the storage module, it has been found to be advantageous to integrate a plurality of storage cells to form a storage module. The storage cells are energy storage devices which exhibit a capacitive behavior. Capacitors in particular are tried and tested. Storage modules can therefore be produced which are particularly suitable for use in energy storage systems particularly in respect of size, type, storable amount of energy, interchangeability, maintainability, etc. The design of the storage modules is therefore decoupled from technological development or refinement, as the individual storage cells need not necessarily always be increasingly powerful in order to enable high-quality storage modules to be produced. A correspondingly powerful storage module can also be produced by integrating a plurality or large number of storage cells to form a storage module. As a result, the storage modules are simply scalable and can be matched and sized to suit the corresponding field of application.

In another advantageous embodiment, the energy storage system has at least one constructional unit, wherein the constructional unit has at least one capacitive storage module and at least parts of the balancing device. For the energy storage arrangement, a plurality of storage modules can be combined into a constructional unit. The parts of the balancing device which are used for balancing the storage modules of this constructional unit can also be incorporated into this constructional unit. Therefore, in respect of handleability, particularly in terms of dimensions and weight, units can be created which are simple to replace. It has been found to be particularly advantageous to construct the energy storage system from a plurality of identical constructional units.

BRIEF DESCRIPTION OF THE DRAWINGS

The invention will now be described and explained in greater detail with reference to the exemplary embodiments illustrated in the accompanying drawings in which.

DETAILED DESCRIPTION OF THE EMBODIMENTS

Figure 1:
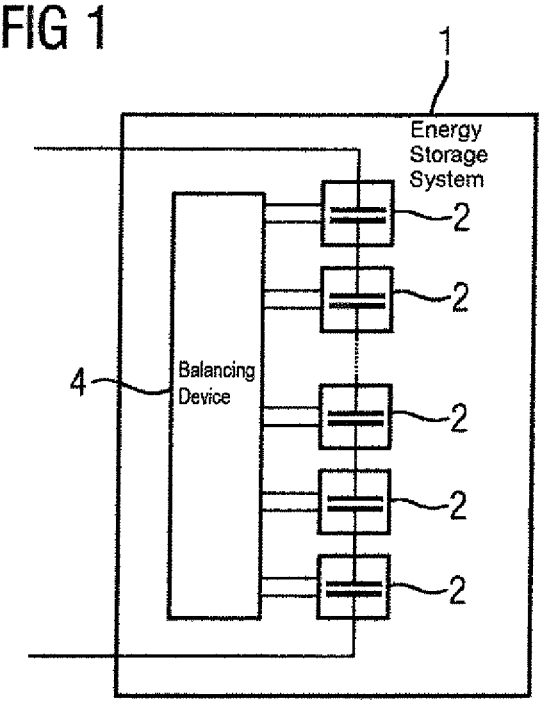
FIG. 1 shows a first exemplary embodiment of an energy storage system.

FIG. 1 shows an energy storage system 1 which comprises capacitive storage modules 2 and a balancing device 4. The capacitive storage modules 2 are connected in series. Each of these capacitive storage modules is connected to the balancing device 4. Both ends of the series circuit are brought out as terminals of the energy storage system 1.

Figure 2:
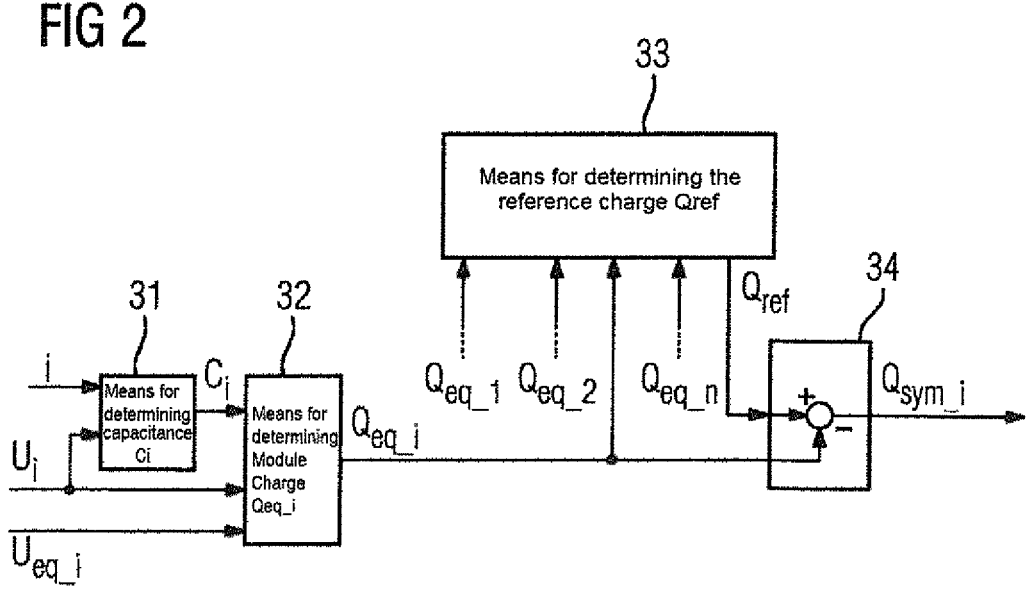
FIG. 2 shows a block diagram for the carrying-out of the method.

FIG. 2 shows a block diagram for determining the balancing charge $Q_{sym\_i}$. The block diagram shows means 31 for determining the capacitance means 32 for determining the module charge $Q_{eq\_i}$, means 33 for determining the reference charge $Q_{ref}$, and means 34 for determining the balancing charge $Q_{sym\_i}$. The calculation steps of the means 31, 32, 34 for determining the capacitance $C_i$, the module charge $Q_{eq\_i}$ and the balancing charge $Q_{sym\_i}$ are carried out for each of the individual capacitive storage modules 2. The subscript i indicates that the calculation relates to the ith capacitive storage module 2 of the at least two capacitive storage modules 2. The means 33 for determining the reference charge $Q_{ref}$ requires the module charges $Q_{eq\_i}$ of the individual storage modules in order to determine the reference charge $Q_{ref}$. The reader is referred at this point to FIG. 3 and the corresponding calculation of the reference charge $Q_{ref}$. The module charge $Q_{eq\_i}$ is determined using the means 32 for determining the module charge $Q_{eq\_i}$. The capacitance $C_i$ of the respective capacitive storage module 2, the voltage $U_i$ of the capacitive storage module 2 and the balancing voltage $U_{eq\_i}$ of the respective capacitive storage module 2 are used as input variables for this purpose. The capacitance $C_i$ can be obtained, for example, from the energy storage system's state monitoring facility which monitors the state of aging of the individual capacitive storage modules 2. In the exemplary embodiment shown in FIG. 2, the capacitance $C_i$ of the respective storage module 2 is determined by means 31 for determining the capacitance $C_i$. Here the voltage $U_i$ of the capacitive storage module 2 and the current i through the series circuit of storage modules 2 are specified as input variables. Alternatively, the current i through the series circuit of capacitive storage modules 2 can be dispensed with if the capacitance $C_i$ is determined via the change of the voltage $U_i$ over time during discharging of the capacitive storage module 2 via a resistance of known resistance value.

Figure 3:
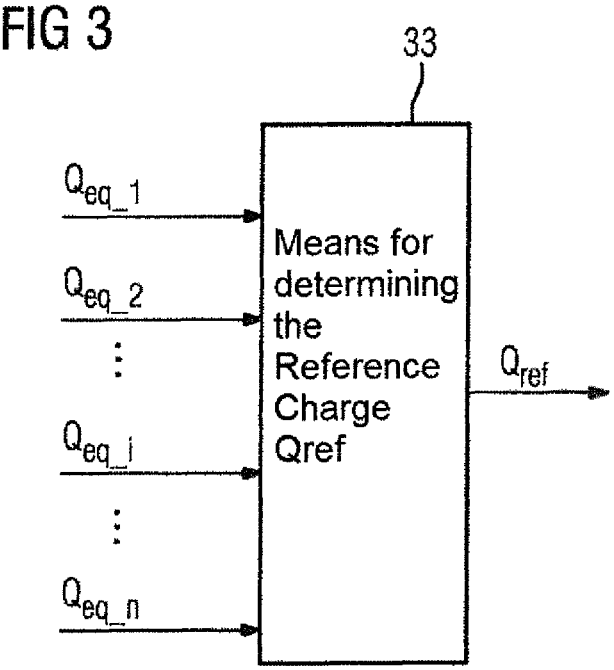
FIG. 3 shows another block diagram for the carrying-out the method.

The module charge $Q_{eq\_i}$ is then supplied to the means 34 for determining the balancing charge $Q_{sym\_i}$. Another input variable required by the means 34 for determining the balancing charge $Q_{sym\_i}$ is the reference charge $Q_{ref}$. The reference charge $Q_{ref}$ is determined on the basis of the individual module charges $Q_{eq\_i}$, as shown in FIG. 3. In the exemplary embodiment shown, the balancing charge $Q_{sym\_i}$ is determined by taking the difference between the reference charge $Q_{ref}$ and the module charge $Q_{eq\_i}$ of the respective capacitive storage module 2. The result is the balancing charge $Q_{sym}$.

FIG. 3 shows the determining of the reference charge $Q_{ref}$ as a function of the individual module charges $Q_{eq\_i}$. The module charges $Q_{eq\_i}$ of the series-connected capacitive storage modules 2 are used as input variables. In general, the number of capacitive storage modules 2 connected in series is denoted by n in this exemplary embodiment. It can be seen that in this exemplary embodiment the module charge of all the series-connected capacitive storage modules 2 is used for determining the reference charge $Q_{ref}$. The reference charge $Q_{ref}$ can be determined as a function of the input variables of the module charges $Q_{eq\_i}$. It has been found to be particularly advantageous for the reference charge $Q_{ref}$ to be determined by the maximum value of the module charge $Q_{eq\_i}$. Alternatively, it has also been found to be advantageous to use the average of the individual module charges $Q_{eq\_i}$ for determining the reference charge $Q_{ref}$.

Figure 4:
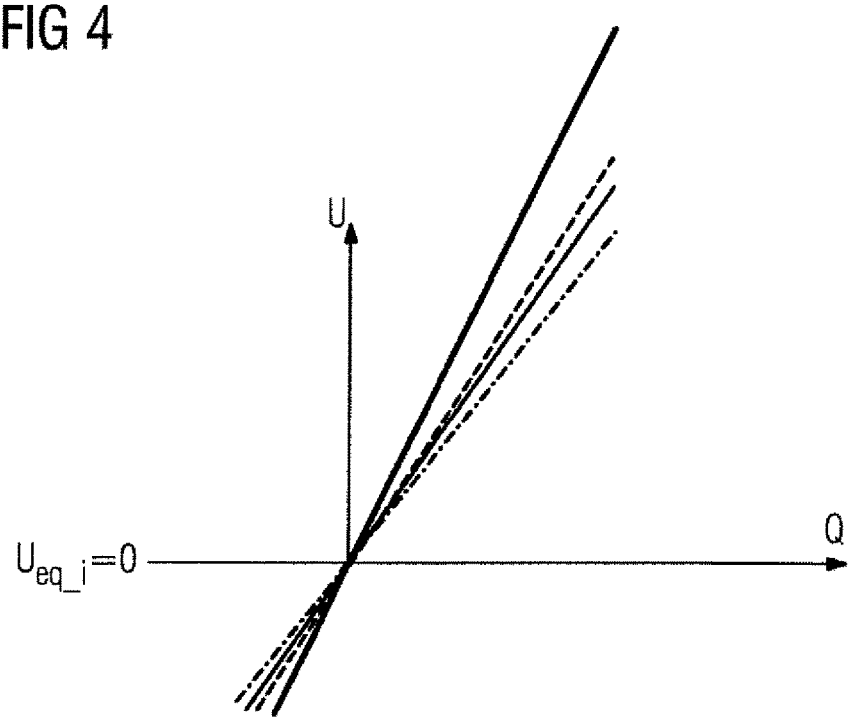
FIG. 4, FIG. 5 show diagrams illustrating the electrical behavior of the storage modules.

FIG. 4 shows the behavior of the voltage $U_i$ of different capacitive storage modules 2 when charges $Q_i$ are added. The voltage $U_i$ increases as a function of the capacitance $C_i$ of the individual capacitive storage module 2 as charge $Q_i$ is introduced. The smaller the capacitance $C_i$, the greater the increase in the voltage $U_i$ when a corresponding charge $Q_i$ is involved. The charge $Q_i$ results from the current i through the storage module. A corresponding current continuously increases the charge $Q_i$ of the storage module. The charge $Q_i$ is derived from the integral of the current i over time. The exemplary embodiment shown in FIG. 4 represents an energy storage system which is balanced in the operating state $U_i$=0. In this example, the balancing voltage $U_{eq\_i}$ is 0V. It can be seen that, without the intervention of a balancing device as the introduced charge a increases, i.e. with the flowing of current i, the voltages $U_i$ diverge because of the different capacitances $C_i$ of the individual capacitive storage modules 2.

Figure 5:
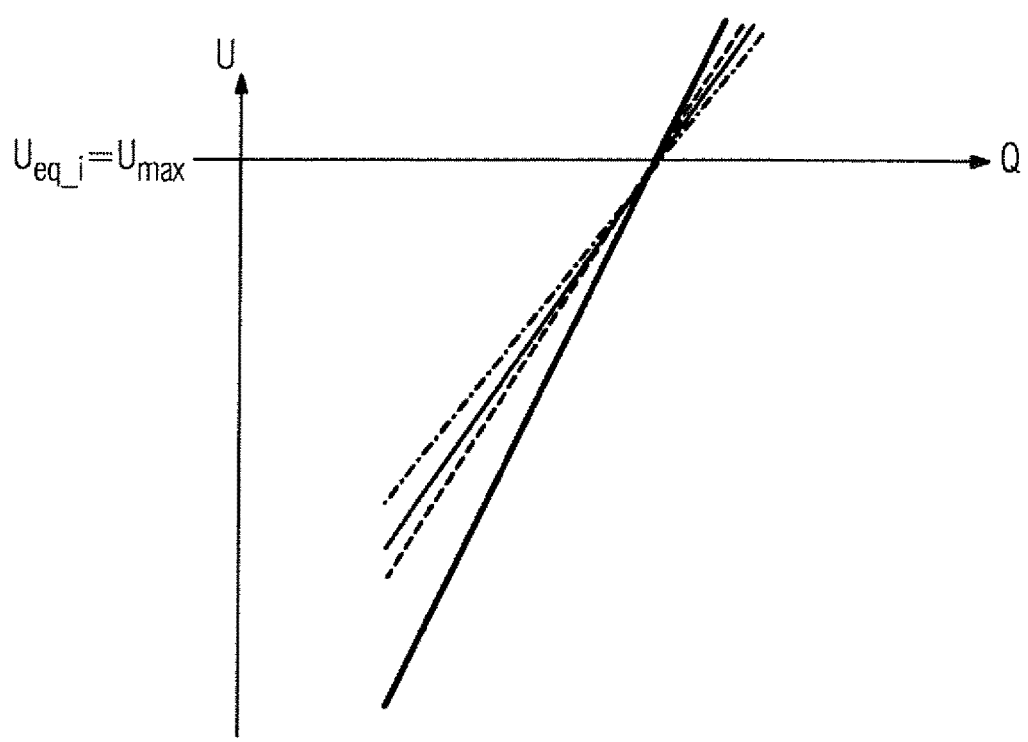

FIG. 5 shows a corresponding energy storage system 1 in which, in contrast to FIG. 4, the balancing voltage $U_{eq\_i}$ corresponds to the maximum voltage $U_{max}$. To avoid repetitions in respect of corresponding elements of the diagram, the reader is referred to the description relating to FIG. 4 and the reference characters introduced there.

Figure 6:
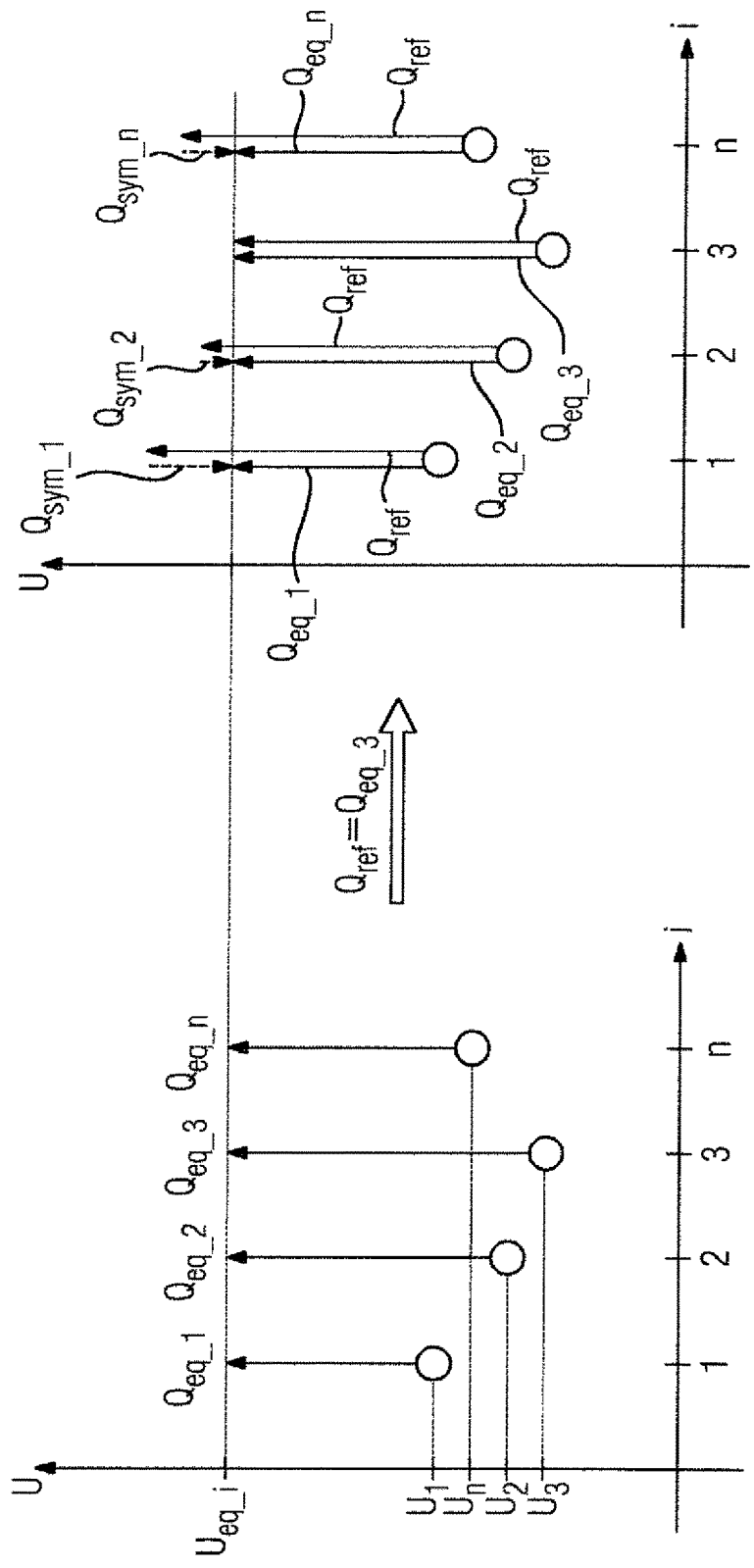
FIG. 6 to FIG. 8 show relationships between voltages and charges of the storage modules for different exemplary embodiments.

FIG. 6 shows the relationship between charges and voltages of the individual capacitive storage modules 2 for the balancing method. The charges of the individual capacitive storage modules 2 are indicated on the horizontal axis. The voltages $U_i$ of the individual capacitive storage modules 2 are indicated on the vertical axis. The voltages $U_i$ of the individual capacitive storage modules 2 and the corresponding balancing voltage $U_{eq\_i}$ are indicated. In the event that the capacitance $C_i$ of the individual capacitive storage modules 2 is of equal size, the length of the arrows constitutes a measure for the corresponding charge. In general, however, the capacitance $C_i$ of the individual capacitive storage modules 2 differs, so that the length of the arrows is then not a measure for the corresponding module charge $Q_{eq\_i}$. The greater the capacitance $C_i$ of a capacitive storage module 2, the more charge is required to vary the corresponding voltage of the storage module.

In this exemplary embodiment, the balancing shall take place using the balancing voltage $U_{eq\_i}$ for the individual capacitive storage modules 2. For explanation of the principle, as can be seen from the diagram, the balancing voltage $U_{eq\_i}$ is set the same for all the capacitive storage modules 2. In general, the balancing voltage $U_{eq\_i}$ of the individual storage modules 2 can be set independently of one another. In the present operating state, the individual capacitive storage modules 2 have different voltages $U_i$. In a first step, the charges $Q_{eq\_i}$ required to bring the individual capacitive storage modules 2 to the voltage $U_{eq\_i}$ must be determined.

The reference voltage $Q_{ref}$ is determined from the individual module charges $Q_{eq\_i}$. In this exemplary embodiment, the reference charge $U_{ref}$ is determined from the maximum value of the individual module charges $Q_{eq\_i}$. In this example, the module charge $Q_{eq\_3}$ therefore constitutes the reference charge $Q_{ref}$. The reference charge $Q_{ref}$ influences the voltage of the individual capacitive storage modules 2 during charging/discharging of the energy storage system 1 by the current i of the series circuit. The then resulting unequal voltages must be equalized by the balancing charges $Q_{sym\_i}$. This is shown in the diagram in that the effect of the reference charge $Q_{ref}$ is influenced by the balancing charge $Q_{sym\_i}$ such that the voltages of the individual capacitive storage modules 2 assume the balancing voltage $U_{eq\_i}$. This exemplary embodiment is particularly suitable for a balancing device 4 which can remove charge from the individual capacitive storage modules 2 by means of one or more resistors. Selecting the reference charge $Q_{ref}$ as the maximum of the individual module charges $Q_{eq\_i}$ produces only balancing charges $Q_{sym\_i}$ which point downward in FIG. 6. These downward pointing balancing charges represent charges which are to be removed from the capacitive storage modules 2. This can take place in a simple manner by means of a resistor. In this exemplary embodiment, it is not necessary for charges to be supplied to a capacitive storage module 2. It can be seen from the diagram that there is no balancing charge $Q_{sym}$ which constitutes an upward pointing arrow in FIG. 6.

Figure 7:
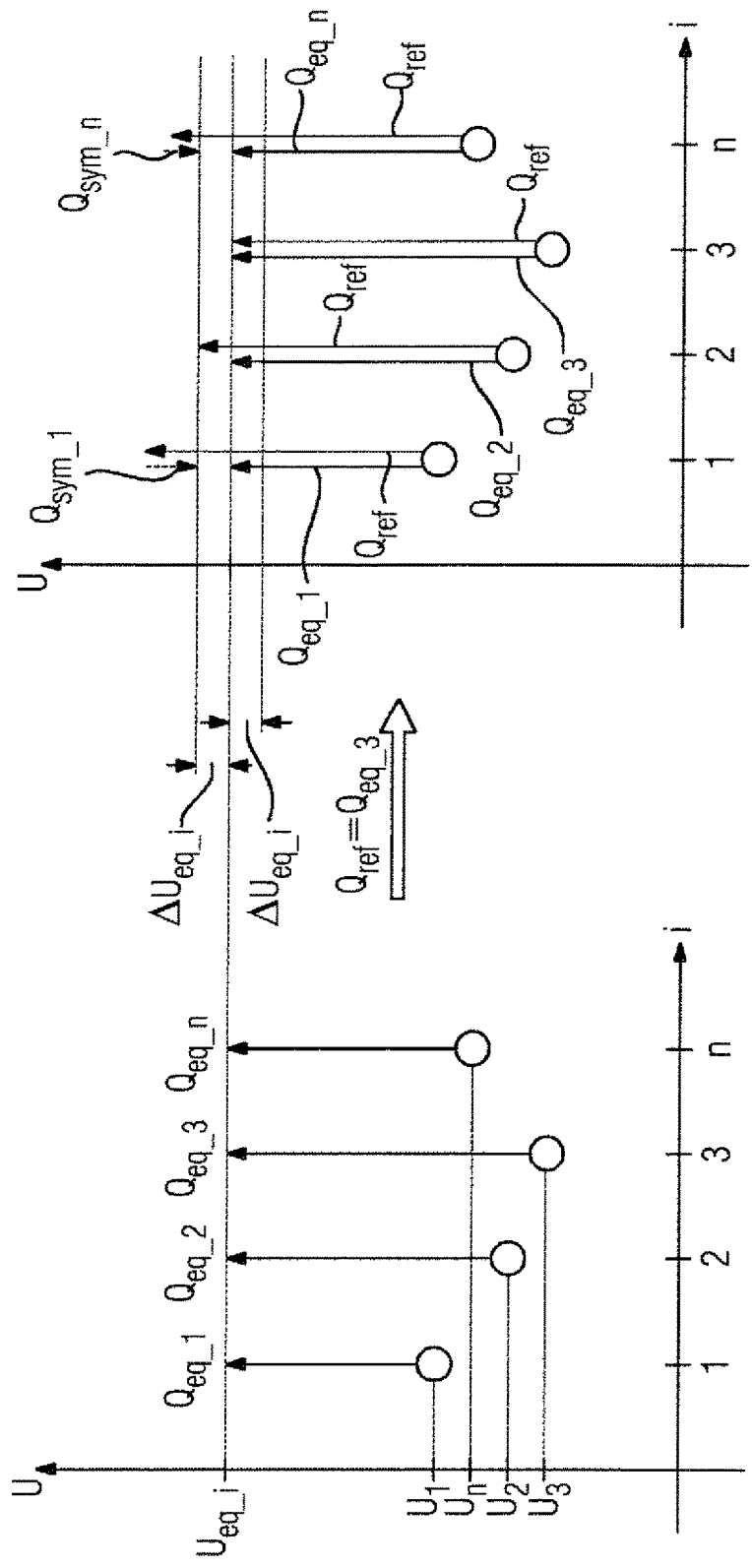

FIG. 7 shows another exemplary embodiment for the balancing method. In this example, a tolerance band $\Delta U_{eq\_i}$ for the balancing voltage is specified in addition to the balancing charge $U_{eq\_i}$. To avoid repetitions in respect of corresponding elements of the diagram, the reader is referred to the description relating to FIG. 6 and the reference characters introduced there. From the predefinition of the tolerance band $\Delta U_{eq\_i}$, the individual balancing charges $Q_{sym\_i}$ can come out smaller in absolute terms. The electrical losses resulting from the flow of current during balancing, in particular by the resistor, are therefore reduced. In the case of the second capacitive storage module 2, the balancing device 4 does not need to be active, as, due to the reference charge $Q_{ref}$, the voltage of the second capacitive storage module 2 is already within the tolerance band $\Delta U_{eq\_i}$ for the balancing voltage $U_{eq\_i}$. This exemplary embodiment is also particularly suitable for balancing by means of one or more resistors.

Figure 8:
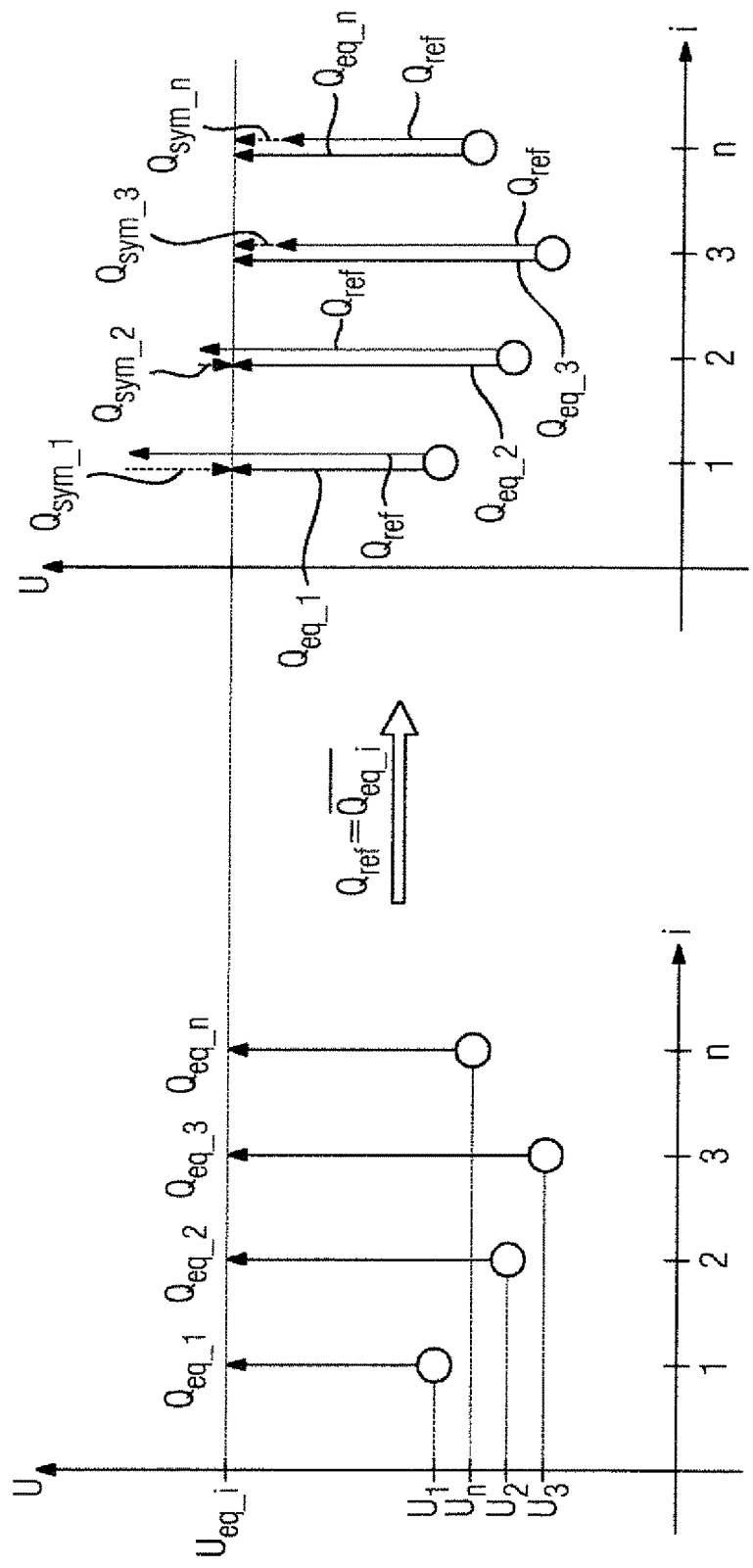

FIG. 8 shows another diagram illustrating the electrical behavior of storage modules. The reference charge $Q_{ref}$ is here the average of the individual module charges $Q_{eq\_i}$. This produces both balancing charges $Q_{sym\_i}$, whereby charge must be removed from the capacitive storage module 2, and balancing charges $Q_{sym\_i}$, whereby charge must be added to the capacitive storage module. The balancing charges $Q_{sym\_i}$ to be removed are indicated in the diagram by the corresponding balancing charge $Q_{sym\_i}$ being represented by a downward pointing arrow. This is the case for the capacitive storage modules having the number 1 and the number 2. In the case of the capacitive storage modules having the number 3 and the number n, the upward pointing arrow of the balancing charge $Q_{sym\_i}$ shows that charge must added to these corresponding capacitive storage modules 2. To avoid repetitions in respect of corresponding elements of the diagram, the reader is once again referred to the description relating to FIGS. 6 and 7 and the reference characters introduced there. The example shown in FIG. 8 is particularly suitable for a design comprising current sources for balancing the individual capacitive storage modules 2. Here it has been found particularly advantageous for the current source to be implemented as a bidirectional current source. The reason for this is that charge not only has to be removed from the individual capacitive storage modules 2 but charge also has to be added to the individual capacitive storage modules 2. A suitable energy source is necessary for this purpose. It has been found to be particularly advantageous to use the method described here when the possibility of charge reversal of individual capacitive storage modules 2 is present. For this charge reversal, charge of individual capacitive storage modules 2 which are to be discharged is fed to other capacitive storage modules 2 to which a corresponding balancing charge $Q_{sym\_i}$ must be added. In the event that the charge to be released and the charge to be received by the capacitive storage modules 2 are of equal size in total, no energy has to be supplied to the balancing device 4 from outside. The corresponding supplying with charge can take place by charge reversal between the individual capacitive storage modules 2. As a result, no electrical losses or at least only small electrical losses therefore arise during balancing.

Figure 9:
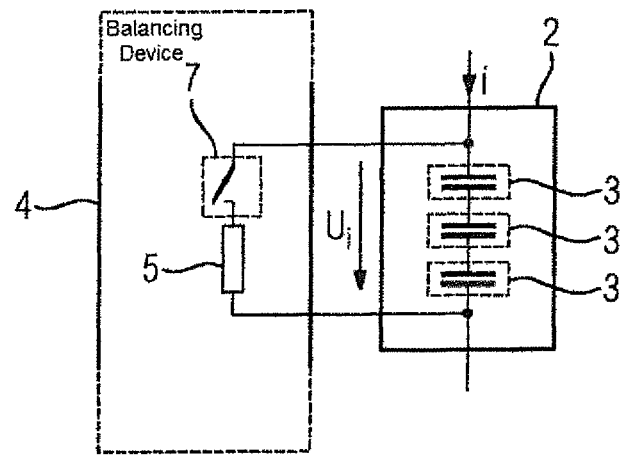
FIG. 9 shows an exemplary embodiment of a storage module and parts of a balancing device.

FIG. 9 shows an exemplary embodiment of a capacitive storage module 2 and parts of a balancing device 4. The capacitive storage module 2 comprises a series circuit of storage cells 3. The storage cells 3 are capacitors, for example. The voltage $U_i$ is present at the terminals of the capacitive storage module. The current i flows through the series circuit and therefore also the capacitive storage module 2 shown in FIG. 9. In the exemplary embodiment shown, the capacitive storage module 2 is connected to a resistor 5 and a final control element 7 of the balancing device 4. Here the final control element 7 is a switch. It has been found to be advantageous to provide for each capacitive storage module 2 a corresponding resistor 5 and a final control element 7. Charge can be removed from the capacitive storage module 2 via the final control element 7, the switch, by means of the resistor 5. The final control element 7 is controlled by a corresponding closed-/open-loop control system which is not shown in this exemplary embodiment.

Figure 10:
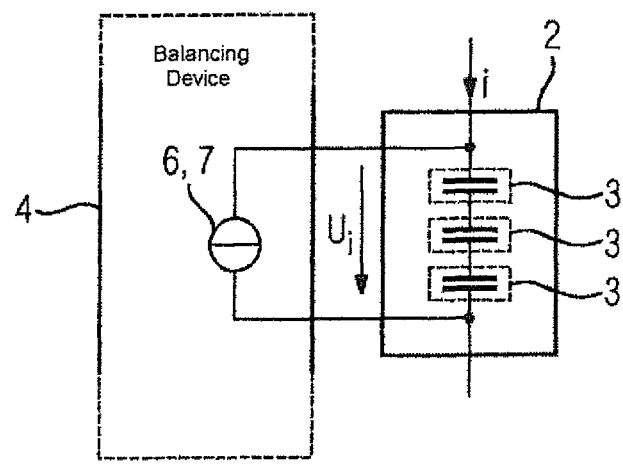
FIG. 10 shows another exemplary embodiment of a storage module and parts of a balancing device.

FIG. 10 shows another exemplary embodiment of a storage module and parts of a balancing device 4. To avoid repetitions in respect of corresponding elements of the diagram, the reader is referred to the description relating to FIG. 9 and the reference characters introduced there. In this example the balancing device 4 has a current source 6 which is simultaneously used as a final control element 7. This current source is electrically connected to the capacitive storage module 2. In contrast to the arrangement with resistor, in this design of the capacitive storage module 2, charge is not only removed but also added. In addition, the current between capacitive storage module 2 and current source 6 can be predefined independently of the voltage $U_i$ of the capacitive storage module 2. It has been found to be advantageous for each capacitive storage module 2 to be connected to a respective current source 6. If charge exchange between the current sources 6 is additionally possible, an exchange of charges between individual capacitive storage modules 2 can hereby take place. This constitutes the possibility of implementing a charge reversal circuit. This enables electrical losses in the energy storage system 1 to be reduced.

Figure 11:
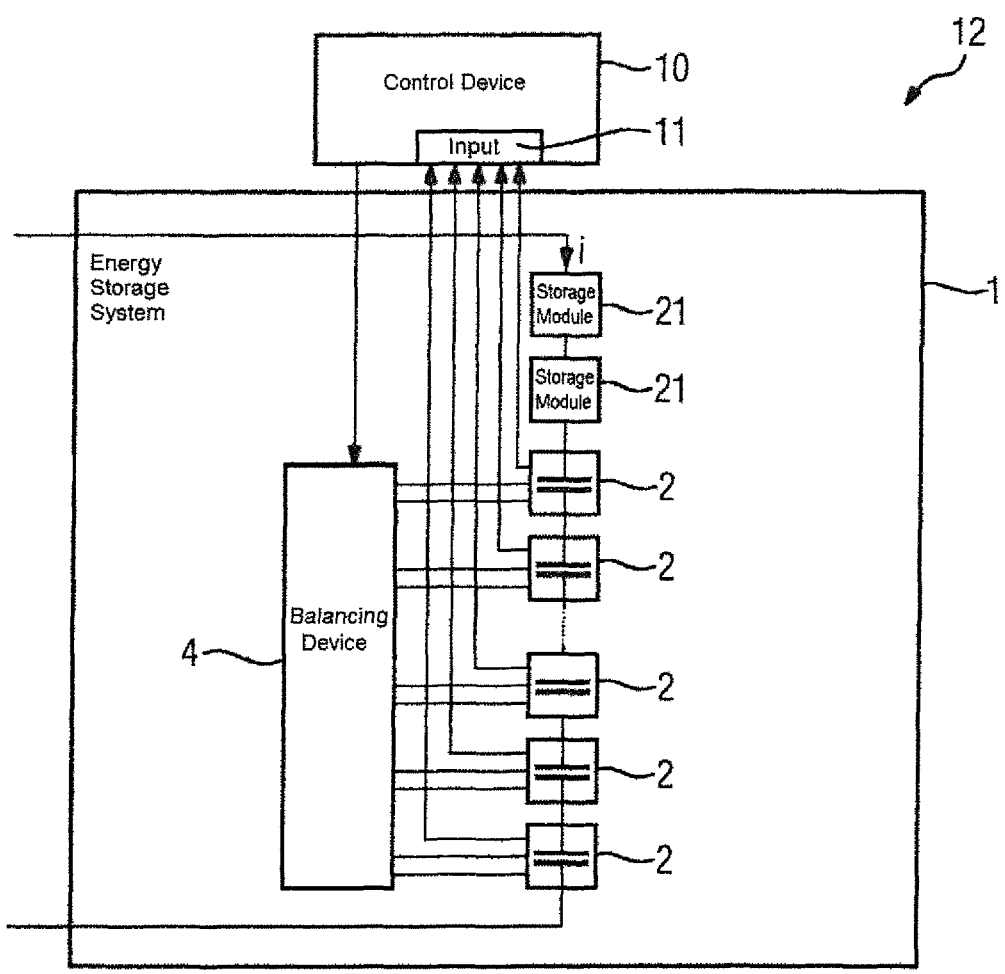
FIG. 11 shows an energy storage arrangement.

FIG. 11 shows an energy storage arrangement 12. This comprises an energy storage system 1 and a control device 10. The energy storage system 1 again comprises a series circuit of capacitive storage modules 2. This series circuit additionally has other storage modules 21. These other storage modules 21 can likewise be additional capacitive storage modules 21 or also batteries, flywheel storage devices or other electrical or chemical energy storage devices. In principle, all energy storage devices can be used as another storage module 21. The capacitive storage modules 2 are in each case electrically connected to the balancing device 4. The control of the charge exchange between capacitive storage module 2 and balancing device 4 is performed by the control device 10. For this purpose, state variables are transmitted from the capacitive storage modules 2 to the input 11 of the control device 12. From this information, control commands for at least one final control element 7 of the balancing device 4 are determined. The final control element 7 can be a switch which enables current to flow through a resistor 7, or a current source 6. The control device 10 can be disposed both inside the energy storage system 1 or, as shown, outside the energy storage system 1. It has been found to be particularly advantageous for the voltage $U_i$ of the capacitive storage modules to be transmitted to the input 11 of the control device 10 as a state variable. This enables the described balancing method to be carried out reliably. In addition, it has further been found advisable to make the current i through the series circuit of the storage modules 2, 21 available to the control device 10. For this purpose a corresponding measured value of the current i must be supplied to the input 11 of the control device 10. This can be used to monitor the functional capability of the energy storage system or also to determine the capacitance $C_i$ of the individual capacitive storage modules.

Although the invention has been illustrated and described in detail by the preferred exemplary embodiments, the invention is not limited solely to the examples disclosed and other variations may be inferred therefrom by persons skilled in the art without departing from the scope of protection sought for the invention.

The invention claimed is:

1. A method for balancing an energy storage system, comprising:
   determining a capacitance of individual capacitive storage modules of a series circuit of at least two capacitive storage modules, with the at least two capacitive storage modules connected to a balancing device to allow control of a charge of each of the capacitive storage modules via a flow of current between the balancing device and the capacitive storage modules;
   determining for each of the individual capacitive storage modules a module charge required to change the individual capacitive storage module from a voltage of the capacitive storage module to a predefined balancing voltage;
   determining a reference charge from the module charges of the capacitive storage modules, wherein the reference charge is formed from a maximum value of all the module charges or from an average value of all the module charges;
   determining for each of the individual capacitive storage modules a balancing charge from a difference between the reference charge and the module charge of the capacitive storage module; and
   controlling the charge of the capacitive storage modules by exchanging the balancing charge between the capacitive storage module and the balancing device.

2. The method of claim 1, wherein the capacitive storage modules have each capacitor, a double-layer capacitor or a lithium capacitor.

3. The method of claim 1, wherein the charge is the same for the capacitive storage modules, with a same current flowing through the capacitive storage modules in the series circuit.

4. The method of claim 1, wherein the balancing voltages of the individual capacitive storage modules are predefined independently of one another.

5. The method of claim 1, wherein the capacitance of each capacitive storage module is determined by a change in the voltage of the capacitive storage module and in the current through the series circuit of the capacitive storage modules.

6. The method of claim 1, further comprising connecting the capacitive storage modules to a resistor, and determining the capacitance of each capacitive storage module from the voltage of the capacitive storage module or from the current through the resistor.

7. The method of claim 1, wherein the balancing charge for the capacitive storage modules is determined from a difference between the reference charge and the module charge of the capacitive storage module.

8. The method of claim 1, wherein the balancing charge for the capacitive storage modules is determined as a function of a predefined tolerance band of the balancing voltage.

9. The method of claim 1, wherein the charges of the capacitive storage modules are exchanged between the capacitive storage modules via the balancing device.

10. The method of claim 1, wherein the balancing voltage of the capacitive storage modules is predefined as a function of a predefined maintenance interval and/or of the capacitance of the capacitive storage modules.

11. The method of claim 1, wherein the capacitance is determined cyclically.

12. A control device, comprising
   an input receiving a voltage of at least two capacitive storage modules of a series circuit of capacitive storage modules, with the at least two capacitive storage modules connected to a balancing device, said control device configured to
   generate a control command as a function of the received voltage to allow control of a charge exchange between the capacitive storage modules and the balancing device,
   determine for each of the individual capacitive storage modules a module charge required to change the individual capacitive storage module from a voltage of the capacitive storage module to a predefined balancing voltage;
   determine a reference charge from the module charges of the capacitive storage modules, wherein the reference charge is formed from a maximum value of all the module charges or from an average value of all the module charges;
   determine for each of the individual capacitive storage modules a balancing charge from a difference between the reference charge and the module charge of the capacitive storage module; and
   control the charge of the capacitive storage modules by exchanging the balancing charge between the capacitive storage module and the balancing device.

13. An energy storage arrangement, comprising:
   an energy storage system including a series circuit of at least two capacitive storage modules, each said capacitive storage module including a capacitor, a double-layer capacitor or a lithium capacitor;
   a balancing device connected to each of the capacitive storage modules such as to allow control of a charge of each capacitive storage module via a flow of current between the balancing device and the capacitive storage module; and
   a control device comprising an input receiving a voltage of at least two capacitive storage modules of the series circuit of the at least two capacitive storage modules, said control device configured to
   generate a control command as a function of the received voltage to allow control of a charge exchange between the capacitive storage modules and the balancing device,
   determine for each of the individual capacitive storage modules a module charge required to change the individual capacitive storage module from a voltage of the capacitive storage module to a predefined balancing voltage;
   determine a reference charge from the module charges of the capacitive storage modules, wherein the reference charge is formed from a maximum value of all the module charges or from an average value of all the module charges;
   determine for each of the individual capacitive storage modules a balancing charge from a difference between the reference charge and the module charge of the capacitive storage module; and
   control the charge of the capacitive storage modules by exchanging the balancing charge between the capacitive storage module and the balancing device.

14. The energy storage arrangement of claim 13, wherein both ends of the series circuit are implemented as terminals of the energy storage system.

15. The energy storage arrangement of claim 13, wherein the balancing device includes a resistor.

16. The energy storage arrangement of claim 13, wherein the balancing device includes a current source.

17. The energy storage arrangement of claim 13, wherein the series circuit of the least two capacitive storage modules includes at least one other storage module.

18. The energy storage arrangement of claim 13, wherein at least one of the capacitive storage modules includes a series circuit and/or parallel circuit of storage cells.

19. The energy storage arrangement of claim 13, further comprising at least one constructional unit including at least one capacitive storage module and at least a part of the balancing device.

20. A vehicle, comprising
- an energy storage arrangement, said energy storage arrangement comprising an energy storage system including a series circuit of least two capacitive storage modules, each said capacitive storage module including a capacitor, a double-layer capacitor or a lithium capacitor,
- a balancing device connected to each of the capacitive storage modules such as to allow control of a charge of each capacitive storage module via a flow of current between the balancing device and the capacitive storage module, and
- a control device comprising an input receiving a voltage of at least two capacitive storage modules of the series circuit of the at least two capacitive storage modules, said control device configured to
  - generate a control command as a function of the received voltage to allow control of a charge exchange between the capacitive storage modules and the balancing device,
  - determine for each of the individual capacitive storage modules a module charge required to change the individual capacitive storage module from a voltage of the capacitive storage module to a predefined balancing voltage;
  - determine a reference charge from the module charges of the capacitive storage modules, wherein the reference charge is formed from a maximum value of all the module charges or from an average value of all the module charges;
  - determine for each of the individual capacitive storage modules a balancing charge from a difference between the reference charge and the module charge of the capacitive storage module; and
  - control the charge of the capacitive storage modules by exchanging the balancing charge between the capacitive storage module and the balancing device.

21. The vehicle of claim 20, constructed in the form of a bus or a rail vehicle.

* * * * *